(12) United States Patent
Tachibana

(10) Patent No.: US 7,397,735 B2
(45) Date of Patent: Jul. 8, 2008

(54) OPTICAL DISK DEVICE CAPABLE OF PREVENTING COLLISION BETWEEN DISK AND OBJECTIVE LENS, AND CONTROL METHOD THEREOF

(75) Inventor: Tadashi Tachibana, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 360 days.

(21) Appl. No.: 10/859,786

(22) Filed: Jun. 3, 2004

(65) Prior Publication Data

US 2004/0246831 A1 Dec. 9, 2004

(30) Foreign Application Priority Data

Jun. 4, 2003 (JP) .............................. 2003-159615

(51) Int. Cl.
G11B 7/09 (2006.01)

(52) U.S. Cl. ............... 369/44.25; 369/44.12; 369/53.25

(58) Field of Classification Search ............. 369/44.25, 369/44.14, 53.25; G11B 7/00, 7/13
See application file for complete search history.

(56) References Cited

U.S. PATENT DOCUMENTS

| | | | |
|---|---|---|---|
| 6,172,838 B1 * | 1/2001 | Ohba ....................... | 360/77.04 |
| 6,246,647 B1 * | 6/2001 | Tsutsui et al. ............ | 369/44.29 |
| 6,738,214 B2 * | 5/2004 | Ishiyama et al. ............. | 360/75 |
| 2003/0107965 A1 * | 6/2003 | Kawabe | |

FOREIGN PATENT DOCUMENTS

| JP | 61-170936 | | 8/1986 |
|---|---|---|---|
| JP | 1-100737 | | 4/1989 |
| JP | 1-162110 | | 11/1989 |
| JP | 4060956 A | * | 2/1992 |
| JP | 4-271023 | | 9/1992 |
| JP | 6-52563 | | 2/1994 |
| JP | 7-129978 | | 5/1995 |
| JP | 8-329482 | | 12/1996 |
| JP | 9-27164 | | 1/1997 |
| JP | 9-259444 | | 10/1997 |
| JP | 10-112035 | * | 4/1998 |
| JP | 11-185363 | | 7/1999 |
| JP | 2002-170232 | | 6/2002 |
| JP | 2003-233911 | | 8/2003 |

OTHER PUBLICATIONS

Mat (machine assisted translation—JP 10-112035.*
MAT (Machine assisted translation) of JP 08-329482.*
Patent Abstracts of Japan, Publication No. 09-259444 dated Oct. 3, 1997, 1 pg.

(Continued)

Primary Examiner—Aristotelis M Psitos
(74) Attorney, Agent, or Firm—Osha Liang LLP

(57) ABSTRACT

The magnitude (Ga) of an impact applied to a lens holder is constantly monitored based on an output of an impact sensor. When it is determined that Ga exceeds Gth, focus servo is released, and the lens holder is provided with a force to make it move away from a disk. Upon recheck of Ga, when it is determined that Ga is now equal to or less than Gth, the force having been provided to the lens holder is cancelled, and the focus servo is resumed.

11 Claims, 4 Drawing Sheets

OTHER PUBLICATIONS

Patent Abstracts of Japan, Publication No. 11-185363 dated Jul. 9, 1999, 1 pg.

Patent Abstracts of Japan, Publication No. 09-027164 dated Jan. 28, 1997, 1 pg.

Patent Abstracts of Japan, Publication No. 2002-170232 dated Jun. 14, 2002, 1 pg.

Notice of Ground of Rejection for Japanese Patent Application No. 2003-159615 mailed on Jun. 7, 2005 and English Translation thereof (5 pages).

Patent Abstracts of Japan, Publication No. 07-129978, Publication Date: May 19, 1995, 1 page.

Partial Translation of Japanese Utility Model Laying-Open No. 1-162110, Date of Laying-Open: Nov. 10, 1989, 2 pages.

Patent Abstracts of Japan, Publication No. 04-271023, Publication Date: Sep. 28, 1992, 1 page.

Patent Abstracts of Japan, Publication No. 01-100737, Publication Date: Apr. 19, 1989, 1 page.

Patent Abstracts of Japan, Publication No. 61-170936, Publication Date: Aug. 1, 1986, 1 page.

Patent Abstracts of Japan, Publication No. 2003-233911, Publication Date: Aug. 22, 2003, 1 page.

Notice of Ground of Rejection for Japanese Patent Application No. 2003/159615 mailed on Feb. 7, 2006, and English translation thereof (6 pages).

Patent Abstracts of Japan, Publication No. 08-329482, Publication Date: Dec. 13, 1996, 1 page.

Patent Abstracts of Japan, Publication No. 06-052563, Publication Date: Feb. 25, 1994, 1 page.

* cited by examiner ic # OPTICAL DISK DEVICE CAPABLE OF PREVENTING COLLISION BETWEEN DISK AND OBJECTIVE LENS, AND CONTROL METHOD THEREOF

BACKGROUND OF THE INVENTION

1. Field of the Invention

The present invention relates to an optical disk device and a control method thereof, and more particularly to an optical disk device permitting control for preventing collision between a disk and an objective lens and a control method thereof.

2. Description of the Background Art

Conventionally, in an optical disk device, reading of information recorded on a disk from light reflected from the disk via an objective lens has been performed. Some of such optical disk devices are provided with an actuator for displacement of the objective lens, where a signal to be applied to the actuator is controlled so as to control the position of the objective lens in the focus direction.

For position control of an objective lens in a focus direction for an optical pickup in an optical disk device, various techniques have conventionally been disclosed for preventing collision between the disk and the objective lens. For example, Japanese Patent Laying-Open No. 9-259444 discloses a technique to make an objective lens recede from a disk by means of a withdrawal mechanism thereof in accordance with a focus error signal that is generated based on a received-light signal of an optical pickup. Further, Japanese Patent Laying-Open No. 11-185363 discloses a technique to drive an objective lens in accordance with an impact applied to the optical disk device.

Conventionally, in the case where the position of the objective lens is controlled by a signal applied to an actuator, when a member holding the objective lens suffers an impact exceeding the range of normal displacement by the actuator, the member itself may oscillate, in which case subsequent position control of the objective lens by means of the actuator may be difficult. As such, there has been a demand for an optical disk device capable of preventing collision of the objective lens to the disk even in such a case.

SUMMARY OF THE INVENTION

The present invention has been made in light of the foregoing situations, and an object of the present invention is to prevent collision between an objective lens and a disk reliably in an optical disk device.

The optical disk device according to the present invention includes an optical pickup irradiating a disk with spotlight and generating a received light signal based on reflected light from the disk. The optical pickup includes a holder, an objective lens set to the holder, an actuator for displacement of the holder in a focus direction, and an impact detecting unit attached to the holder and detecting magnitude of an impact applied to the holder. The optical disk device further includes an actuator driving unit that generates a focus error signal based on the received light signal generated by the optical pickup, outputs a drive signal to the actuator based on the focus error signal, and stops the output of the drive signal to the actuator when the magnitude of the impact detected by the impact detecting unit exceeds a prescribed value.

Preferably, in the optical disk device of the present invention, when the magnitude of the impact detected by the impact detecting unit exceeds the prescribed value, the actuator driving unit stops the output of the drive signal to the actuator for a prescribed period of time, and then outputs a drive signal to the actuator to make the objective lens move away from the disk.

Still preferably, the optical disk device of the present invention further includes a rotating unit rotating the disk. In this case, the actuator driving unit includes storage means for storing the prescribed value. The prescribed value corresponds to a value of the magnitude of a maximum impact pre-detected by the impact detecting unit during a period of rotation of the disk by the rotating unit in a state where the holder suffers no external impact, added with a prescribed margin that is predetermined for the impact applied to the holder.

The storage means may be a common memory, or a comparator storing, e.g., a voltage for comparison or the like.

The control method of an optical disk device according to the present invention is for controlling an optical disk device including an optical pickup irradiating a disk with spotlight and generating a received light signal based on reflected light from the disk. The optical pickup includes a holder, an objective lens set to the holder, and an actuator for displacement of the holder in a focus direction. The control method includes the step of generating a focus error-signal based on the received light signal generated by the optical pickup, the step of outputting a drive signal to the actuator based on the focus error signal, the step of detecting magnitude of an impact applied to the holder, and the step of stopping the output of the drive signal to the actuator when the magnitude of the impact applied to the holder exceeds a prescribed value.

Preferably, in the control method of an optical disk device of the present invention, the step of stopping the output of the drive signal to the actuator includes the step of, after stopping the output of the drive signal to the actuator for a prescribed period of time, outputting a drive signal to the actuator to make the objective lens move away from the disk.

Still preferably, the control method of an optical disk device of the present invention further includes the step of rotating the disk and the step of storing the prescribed value. The prescribed value corresponds to a value of the magnitude of a maximum impact pre-detected during a period of rotation of the disk in a state where the holder suffers no external impact, added with a prescribed margin predetermined for the impact applied to the holder.

According to the present invention, the position control of the holder by means of the actuator is stopped when the impact applied to the holder exceeds a prescribed value. Oscillation of the holder is prevented even when the holder receives an impact exceeding the range of normal displacement by the actuator, and thus, it is possible to avoid the situation where the subsequent position control by the actuator becomes difficult. Accordingly, the collision between the objective lens and the disk is prevented reliably.

Further, according to the present invention, when the impact applied to the holder exceeds a prescribed value, the position of the holder is controlled to make the objective lens move away from the disk, only after vibration of the holder abates. This further ensures prevention of the collision between the objective lens and the disk.

Still further, according to the present invention, the prescribed value used as the reference of the impact applied to the holder is set appropriately. As such, the collision between the objective lens and the disk can be prevented still more reliably.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an information recording and reproduction apparatus as an embodiment of the present invention will be described in detail with reference to the drawings.

Figure 1:
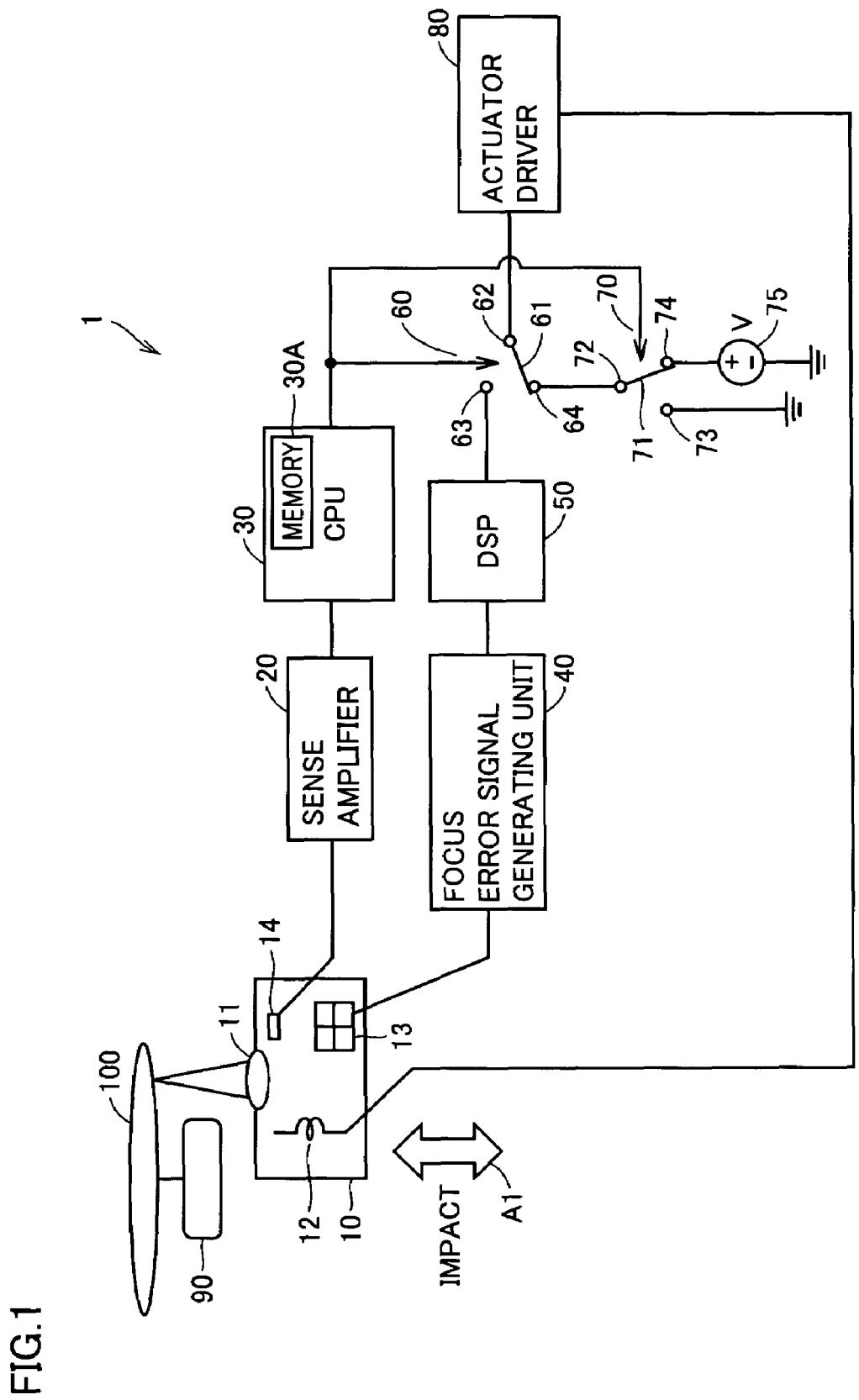
FIG. 1 shows a configuration of a portion of an information recording and reproduction apparatus according to an embodiment of the present invention, associated with position control of an objective lens in a focus direction for a pickup.

Referring to FIG. 1, the information recording and reproduction apparatus 1 is capable of writing and reading information to and from a disk 100. Information recording and reproduction apparatus 1 includes, among others, a pickup 10, a sense amplifier 20, a central processing unit (CPU) 30, a focus error signal generating unit 40, a digital signal processor (DSP) 50, switches 60, 70, an actuator driver 80, and a disk motor 90. CPU 30 has a memory 30A for storing various data. Disk motor 90 is provided to rotate disk 100 as appropriate.

Pickup 10 irradiates disk 100 with light by means of a mechanism (not shown), and receives reflected light from disk 100 via an objective lens 11. Pickup 10 can record information on disk 100 by means of a mechanism (not shown) as well. In pickup 10, the reflected light obtained via objective lens 11 is sent to a photodetector 13 for conversion to a signal. Focus error signal generating unit 40 generates a focus error signal based on the signal generated by photodetector 13, and sends the focus error signal to DSP 50. DSP 50, based on the input focus error signal, controls a current value to be sent from actuator driver 80 to a focus coil 12, so as to control the position of objective lens 11 in a focus direction (indicated by a double-headed arrow A1).

Information recording and reproduction apparatus 1 has switch 60 for switching ON/OFF of connection between DSP 50 and actuator driver 80. Switch 60 can change the state of connection of a switch 61 that is for connecting a terminal 62 on the side of actuator driver 80 either to a terminal 63 on the side of DSP 50 or to a terminal 64 not connected to DSP 50. Information recording and reproduction apparatus 1 further has switch 70 capable of changing the state of connection of a switch 71. Switch 71 connects a terminal 72 connected to terminal 64 either to a grounded terminal 73 or to a terminal 74 connected to a power source 75 that outputs a voltage V.

Normally, at the time when DSP 50 controls the current value sent from actuator driver 80 to focus coil 12 so as to control the position of objective lens 11 in the focus direction based on the input focus error signal, terminals 62 and 63 are connected to each other via switch 61. CPU 30 controls the states of connection of switches 61 and 71 in accordance with the magnitude of an impact applied to objective lens 11, as will be described later with reference to FIG. 4.

Now, the position control of objective lens 11 in the focus direction is described in more detail with reference to FIG. 2.

Figure 2:
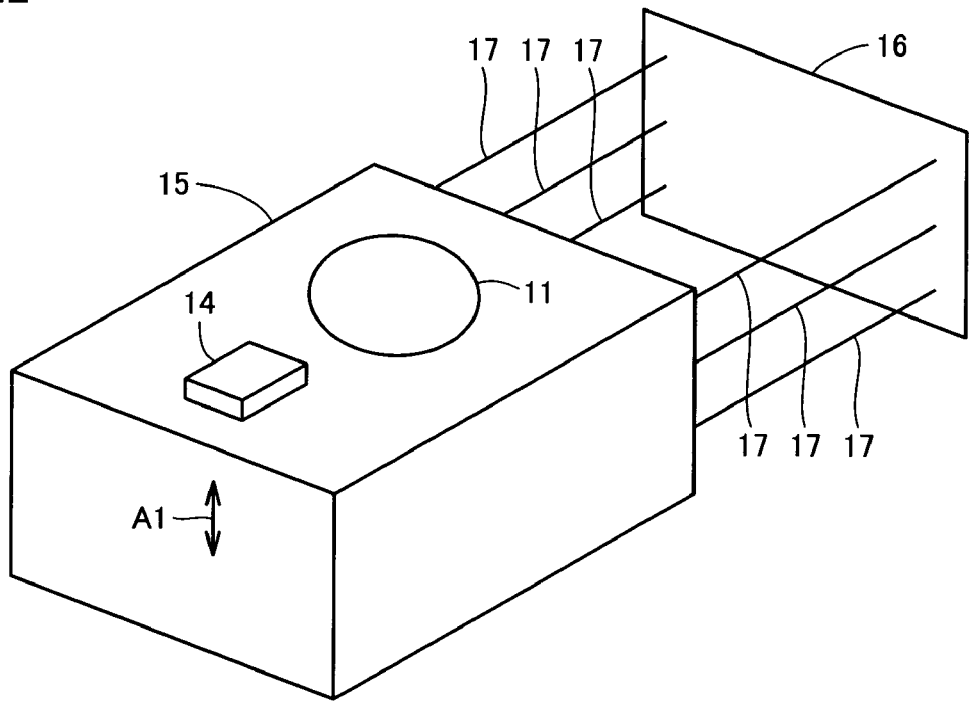
FIG. 2 shows a lens holder to which the objective lens is attached, included in the information recording and reproduction apparatus shown in FIG. 1.

Referring to FIG. 2, a lens holder 15 has objective lens 11 and an impact sensor 14 attached thereto. A magnet (not shown) is also attached to lens holder 15. Lens holder 15 is supported by a plurality of pieces of wire 17 with respect to a substrate 16 provided in pickup 10.

Focus coil 12 described above is fixed to the outside of lens holder 15. As the current value sent from actuator driver 80 to focus coil 12 is changed as described above, the magnetic field generated at focus coil 12 changes. Such change of the magnetic field acts on the magnet attached to lens holder 15, causing displacement of lens holder 15 in the focus direction (corresponding to the direction of double-headed arrow A1).

Impact sensor 14 is for detecting the magnitude of an impact applied to lens holder 15 in the focus direction. Impact sensor 14 may be a charge sensitive type acceleration sensor, for example, that can output the impact (acceleration) applied to lens holder 15 as an electrical signal. A configuration of the charge sensitive type acceleration sensor as an example of impact sensor 14 is shown in FIG. 3.

Figure 3:
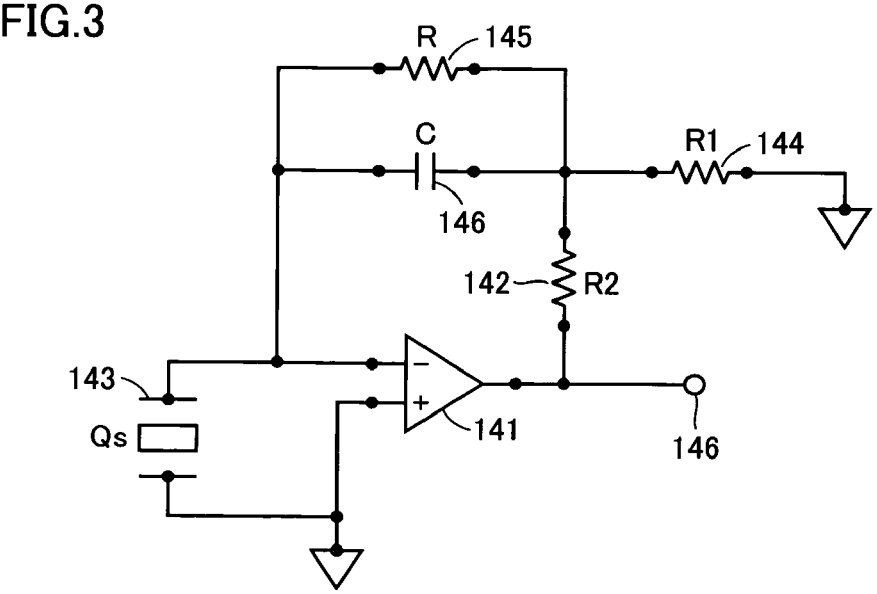
FIG. 3 shows a configuration of a charge sensitive type acceleration sensor as an example of an impact sensor attached to the lens holder shown in FIG. 2.

Referring to FIG. 3, in impact sensor 14, a comparator 141, a resistance 142 (resistance value: R2), a resistance 144 (resistance value: R1), a resistance 145, a capacitor 146 (capacitance: C), and a piezoelectric element 143 (charge sensitivity: Qs) are connected as shown in FIG. 3. Comparator 141 has one input (+ side) grounded. In impact sensor 14, at a terminal 146 connected to the output side of comparator 141, an acceleration output voltage Vout represented by the following expression (1) is obtained from resistance values R1, R2, capacitance C and charge sensitivity Qs.

$$Vout = -(1 + R2/R1) \times Qs/C \qquad (1)$$

Referring again to FIG. 1, acceleration output voltage Vout output from impact sensor 14 is input to sense amplifier 20 and converted to the magnitude of the impact received by lens holder 15, which is then input to CPU 30. When the magnitude of the impact received by lens holder 15 exceeds a prescribed value (Gth), CPU 30 releases focus servo of DSP 50. The focus servo refers to control of the current value sent from actuator driver 80 to focus coil 12 that is conducted by DSP 50 based on the input focus error signal so as to control the position of objective lens 11 in the focus direction. The release of the focus servo refers to the state where switch 61 connects terminal 62 to terminal 64 instead of terminal 63.

An impact handling process, performed by CPU 30 in response to the impact received by lens holder 15, is now described.

Figure 4:
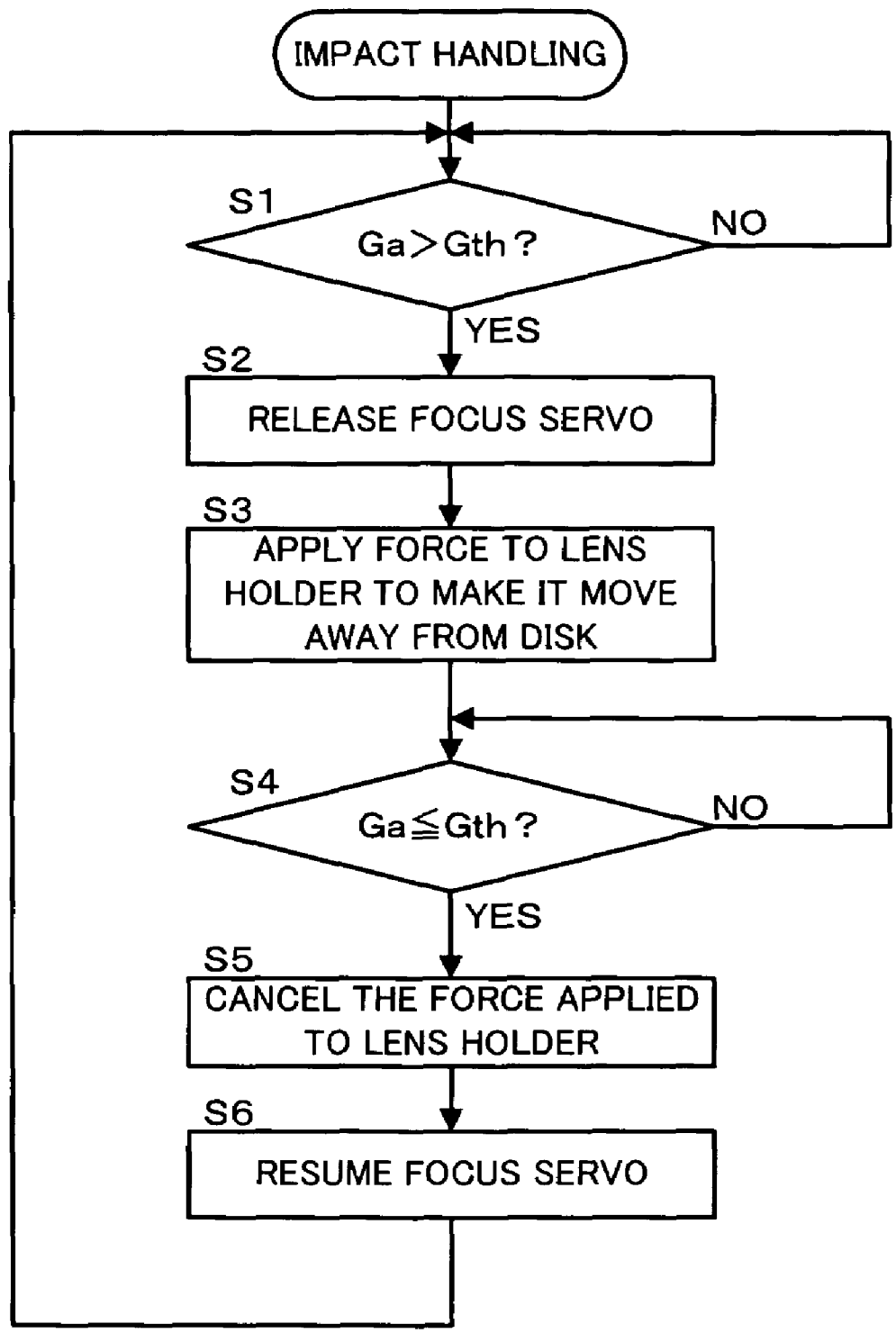
FIG. 4 is a flowchart of an impact handling process that is performed by a CPU of the information recording and reproduction apparatus shown in FIG. 1.

Referring to FIG. 4, CPU 30 constantly monitors the magnitude (Ga) of an impact applied to lens holder 15 based on an output of impact sensor 14, and determines whether Ga exceeds the above-described Gth (step S1, hereinafter, the "step" is not repeated). When it is determined that the magnitude Ga of the impact exceeds Gth, the process goes to S2. In this state, terminals 62 and 63 are connected to each other via switch 61, since DSP 50 controls the current value being sent from actuator driver 80 to focus coil 12 so as to control the position of objective lens 11 in the focus direction based on the input focus error signal.

Then, in S2, CPU 30 connects terminal 62 to terminal 64, with which the focus servo is released.

Next, in S3, CPU 30 connects terminal 72 to terminal 74, with which a voltage V is applied from power source 75 to actuator driver 80. When voltage V is applied to actuator driver 80, a current flows through focus coil 12 such that lens holder 15 is moved away from disk 100. That is, the process in S3 provides lens holder 15 with the force to make it recede from disk 100.

In S4, CPU 30 checks again the magnitude Ga of the impact applied to lens holder 15, and determines whether Ga is now not greater than Gth. When it is determined that Ga is equal to or less than Gth, CPU 30 connects terminal 72 to terminal 73 in S5. This cancels the force having been applied to lens holder 15 in S3 to make it move away from disk 100.

In S6, CPU 30 changes the current-carrying state to switch 60 such that terminals 62 and 63 are connected via switch 61. The process thus returns to S1 to resume the focus servo.

Figure 5:
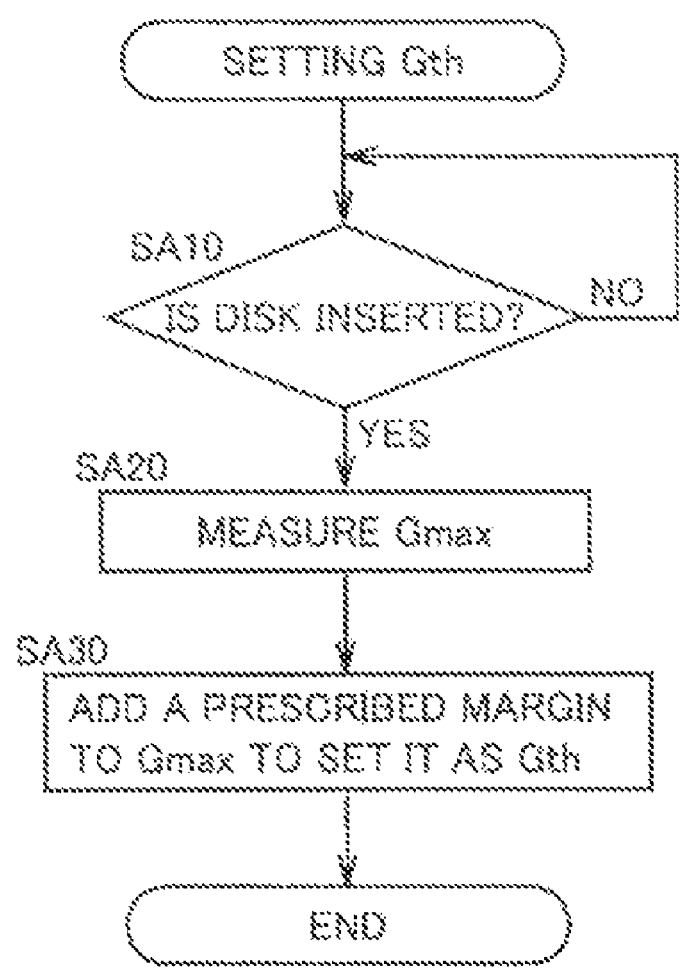
FIG. 5 is a flowchart of a process for setting an appropriate prescribed value for the impact handling process of FIG. 4.

In the embodiment described above, Gth used as the reference of the magnitude of the impact can be determined as appropriate in accordance with the size or shape of the device. For example, Gth may be set as shown in FIG. 5. Referring to FIG. 5, when disk 100 is inserted into information recording and reproduction apparatus 1 (SA10), the magnitude Gmax of a maximum impact (acceleration) during a period of rotation of disk 100 is measured (SA20), and a prescribed margin is added to Gmax to set it as Gth (SA30). Gth thus set is stored in memory 30A, for example, and is read from memory 30A upon the impact handling process as shown in FIG. 4.

The impact handling process as shown in FIG. 4 may be performed by DSP 50 alternatively.

In the above-described embodiment, information recording and reproduction apparatus 1 may handle any kinds of disks, including a compact disk (CD), a digital versatile disk (DVD) and a magneto optical disk (MO), as long as they have optically readable information recorded thereon.

Further, although the device performing both recording and reproduction of information has been described in the above embodiment, the present invention is also applicable to a device performing reproduction only.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk device, comprising:
an optical pickup configured to irradiate a disk with light and to generate a received light signal based on reflected light from the disk,
said optical pickup including a holder, an objective lens held by said holder, an actuator for displacement of said holder in a focus direction, and an impact detecting unit attached to said holder and configured to detect magnitude of an impact applied to said holder;
a rotating unit configured to rotate the disk; and
an actuator driving unit responsive to the impact detecting unit and having a storage unit configured to store a prescribed value, wherein the actuator driving unit generates a focus error signal based on the received light signal generated by said optical pickup, outputs a drive signal to said actuator based on the focus error signal, and stops the output of the drive signal to said actuator for a prescribed period of time based on a signal from the impact detecting unit when the magnitude of the impact detected by said impact detecting unit exceeds the prescribed value,
wherein the prescribed value is determined after insertion of the disk in the optical disk device by adding a prescribed margin to a measured maximum impact value obtained from the impact detecting unit during a period of rotation after the disk is inserted in the optical disk device.

2. The optical disk device according to claim 1, wherein the impact detecting unit comprises a charge sensitive type acceleration sensor.

3. An optical disk device, comprising:
an optical pickup configured to irradiate a disk with light and to generate a received light signal based on reflected light from the disk,
said optical pickup including a holder, an objective lens held by said holder, an actuator for displacement of said holder in a focus direction, and an impact detecting unit attached to said holder and configured to detect magnitude of an impact applied to said holder;
a rotating unit configured to rotate the disk; and
an actuator driving unit responsive to the impact detecting unit and having a storage unit configured to store a prescribed value, wherein the actuator driving unit generates a focus error signal based on the received light signal generated by said optical pickup, outputs a drive signal to said actuator based on the focus error signal, and stops the output of the drive signal to said actuator based on a signal from the impact detecting unit when the magnitude of the impact detected by said impact detecting unit exceeds the prescribed value,
wherein, when the magnitude of the impact detected by said impact detecting unit exceeds the prescribed value, said actuator driving unit stops the output of the drive signal to said actuator for a prescribed period of time, and then outputs a drive signal to said actuator to make said objective lens move away from the disk, and
wherein the prescribed value is determined after insertion of the disk in the optical disk device by adding a prescribed margin to a measured maximum impact value obtained from the impact detecting unit during a period of rotation after the disk is inserted in the optical disk device.

4. The optical disk device according to claim 3, wherein the impact detecting unit comprises a charge sensitive type acceleration sensor.

5. A control method of an optical disk device including an optical pickup irradiating a disk with light and generating a received light signal based on reflected light from the disk, said optical pickup including a holder, an objective lens set to said holder, and an actuator for displacement of said holder in a focus direction, the method comprising:
rotating the disk after insertion in the optical disk device;
measuring a maximum impact value during the rotating using an impact detecting unit;
determining a prescribed value by adding a prescribed margin to the measured maximum impact value;
generating a focus error signal based on the received light signal generated by said optical pickup;
outputting a drive signal to said actuator based on said focus error signal;
detecting magnitude of an impact applied to said holder using the impact detecting unit; and
stopping the output of the drive signal to said actuator for a prescribed period of time when the magnitude of the impact applied to said holder exceeds the prescribed value.

6. The control method of an optical disk device according to claim 5, further comprising:
outputting a drive signal to said actuator to make said objective lens move away from the disk.

7. The control method of an optical disk device according to claim 5, further comprising storing said prescribed value.

8. The control method of an optical disk device according to claim 7, further comprising:
   outputting a drive signal to said actuator to make said objective lens move away from the disk.

9. The control method of an optical disk device according to claim 5, wherein the impact detecting unit comprises a charge sensitive type acceleration sensor.

10. An optical disk device, comprising:
    an optical pickup comprising:
        an objective lens held by a holder for irradiating a disk with light and receiving a reflected light from the disk;
        a photodetector for converting the reflected light to a reflected light signal;
        an actuator for displacement of the holder in a focus direction; and
        an impact detection unit for detecting a magnitude of an impact applied to the holder,
    a rotating unit for rotating the disk;
    a first controller electrically connected to the actuator for controlling a current value to the actuator so as to control a position of the objective lens based on the reflected light signal from the photodetector; and
    a second controller electrically connected to the actuator and the impact detection unit, wherein when the magnitude of the impact detected by the impact detection unit exceeds a prescribed value, the second controller stops the current to the actuator for a prescribed period of time, and then, outputs a drive signal to the actuator such that the objective lens moves away from the disk,
    wherein the prescribed value is determined after insertion of the disk in the optical disk device by adding a prescribed margin to a measured maximum impact value obtained from the impact detecting unit during a period of rotation after the disk is inserted in the optical disk device.

11. The optical disk device according to claim 10, wherein the impact detecting unit comprises a charge sensitive type acceleration sensor.

* * * * *